United States Patent
Cho et al.

(10) Patent No.: US 10,225,528 B2
(45) Date of Patent: Mar. 5, 2019

(54) MEDIA PROCESSING APPARATUS FOR MULTI-DISPLAY SYSTEM AND METHOD OF OPERATION THEREOF

(71) Applicant: SAMSUNG ELECTRONICS CO., LTD., Suwon-si (KR)

(72) Inventors: Dae-sung Cho, Suwon-si (KR); Sung-jin Kim, Suwon-si (KR); Woo-sung Shim, Suwon-si (KR); Jae-hyun Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 14/823,353

(22) Filed: Aug. 11, 2015

(65) Prior Publication Data

US 2016/0093271 A1 Mar. 31, 2016

(30) Foreign Application Priority Data

Sep. 30, 2014 (KR) .......................... 10-2014-0132011

(51) Int. Cl.
*G06F 3/01* (2006.01)
*H04N 9/12* (2006.01)
*G06F 3/14* (2006.01)
*H04N 21/41* (2011.01)
(Continued)

(52) U.S. Cl.
CPC .............. *H04N 9/12* (2013.01); *G06F 3/013* (2013.01); *G06F 3/1446* (2013.01);
(Continued)

(58) Field of Classification Search
CPC .............................. G06F 3/013; G06F 3/1446
See application file for complete search history.

(56) References Cited

U.S. PATENT DOCUMENTS

2003/0095599 A1 5/2003 Lee et al.
2008/0068285 A1* 3/2008 Kondo ............... H04N 5/44582
345/1.1
(Continued)

FOREIGN PATENT DOCUMENTS

JP 2000224465 A 8/2000
JP 2012058475 A 3/2012
KR 100643453 B1 11/2006

OTHER PUBLICATIONS

Communication dated Aug. 21, 2015, issued by the Korean Intellectual Property Office in counterpart Korean Application No. 10-2014-0132011.

*Primary Examiner* — Dennis Joseph
(74) *Attorney, Agent, or Firm* — Sughrue Mion, PLLC

(57) ABSTRACT

Apparatuses and methods for reproducing an image in a plurality of displays are provided. The method includes obtaining a display identifier that identifies a position of a display among the plurality of displays, based on information on an arrangement of the plurality of displays transmitted by the image reproduction control apparatus; obtaining an image segment to be reproduced in a display corresponding to the display identifier among the plurality of displays, from the image; determining the importance factor of the image segment based on at least one of the image and the viewing environment of the plurality of displays; generating an encoded image segment by encoding the image segment according to an encoding method corresponding to the importance factor; and transmitting a bitstream including the display identifier, the importance factor and the encoded image segment to the image reproduction control apparatus.

11 Claims, 17 Drawing Sheets

(51) Int. Cl.
 *H04N 21/242*  (2011.01)
 *H04N 9/31*  (2006.01)
 *H04N 21/258*  (2011.01)
 *H04N 21/414*  (2011.01)
 *H04N 21/845*  (2011.01)

(52) U.S. Cl.
 CPC ......... *H04N 9/3147* (2013.01); *H04N 21/242* (2013.01); *H04N 21/25833* (2013.01); *H04N 21/25841* (2013.01); *H04N 21/4122* (2013.01); *H04N 21/41415* (2013.01); *H04N 21/8456* (2013.01); *G09G 2320/0261* (2013.01); *G09G 2340/02* (2013.01); *G09G 2356/00* (2013.01); *H04N 2201/3228* (2013.01)

(56) References Cited

U.S. PATENT DOCUMENTS

| | | | |
|---|---|---|---|
| 2011/0148934 A1* | 6/2011 | Nurmi | G06F 3/0481 345/672 |
| 2012/0056902 A1 | 3/2012 | Yoshino | |
| 2014/0007170 A1 | 1/2014 | Klappert et al. | |
| 2014/0009562 A1 | 1/2014 | Hegde et al. | |
| 2014/0020025 A1 | 1/2014 | Anderson et al. | |
| 2014/0028811 A1 | 1/2014 | Ebersole | |
| 2014/0028907 A1 | 1/2014 | Nuyttens et al. | |
| 2014/0032636 A1 | 1/2014 | Nelson | |
| 2014/0038514 A1 | 2/2014 | Robbins | |
| 2014/0040966 A1 | 2/2014 | Chen et al. | |
| 2015/0187333 A1* | 7/2015 | Loeffler | G06F 3/1438 345/1.3 |

\* cited by examiner

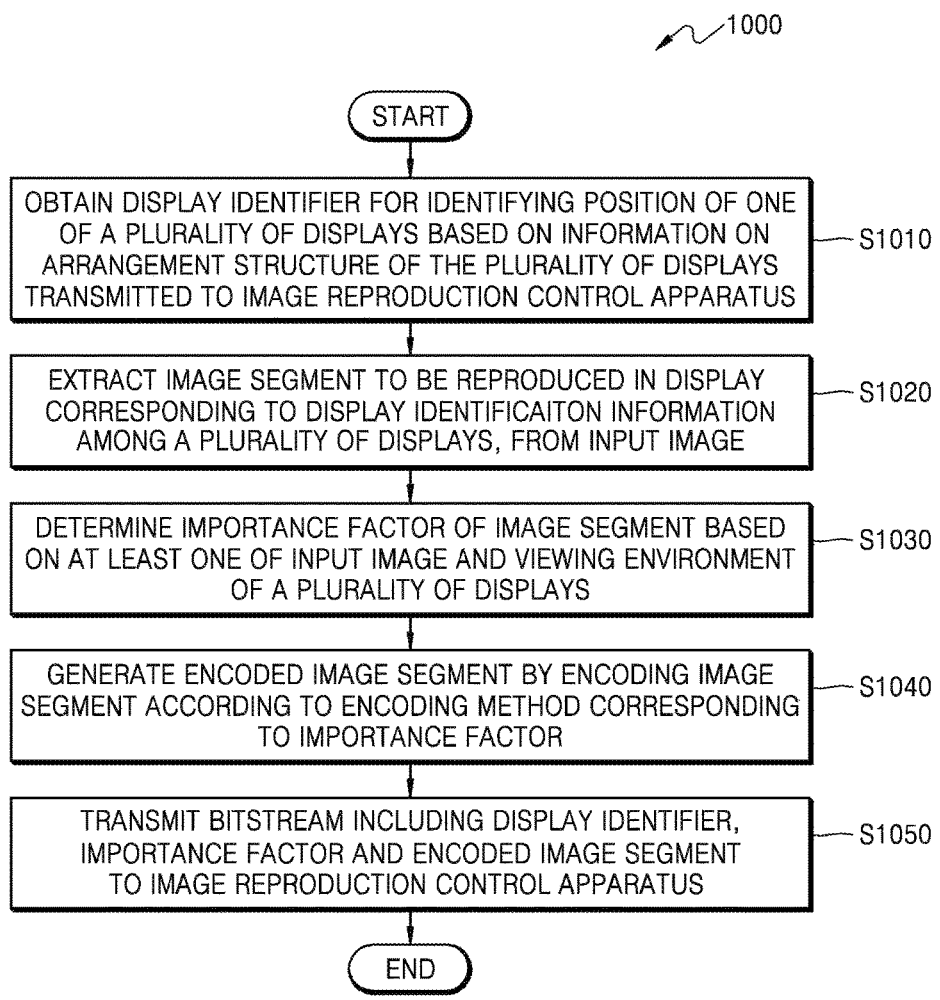

MEDIA PROCESSING APPARATUS FOR MULTI-DISPLAY SYSTEM AND METHOD OF OPERATION THEREOF

RELATED APPLICATION

This application claims priority from Korean Patent Application No. 10-2014-0132011, filed on Sep. 30, 2014 in the Korean Intellectual Property Office, the disclosure of which is incorporated by reference herein in its entirety.

BACKGROUND

1. Field

Apparatuses and methods consistent with exemplary embodiments relate to a media processing method and apparatus, and more particularly, to a method and apparatus for processing media reproduced in a multi-display system.

2. Description of the Related Art

In order to reproduce high resolution images s, multi-display systems that use a plurality of displays to display images have been used. As an example, multi-display systems have been used to display video content to large crowds at an arena or other large gathering. Also with the growing distribution of displays, an increasing number of ordinary households have two or more displays connected as a multi-display system to view. Further, a system that enables a plurality of displays to be used as if the displays were a single display is required to overcome the limitations of image enlargement that exists in a single display. Accordingly, research on multi-display systems is continuously needed.

SUMMARY

One or more exemplary embodiments provide a method and apparatus for processing media reproduced in a multi-display system. One or more exemplary embodiments also provide a recording medium having embodied thereon a computer program for executing the method of processing media. According to an aspect of an exemplary embodiment, there is provided a method of transmitting an image to an image reproduction control apparatus so as to be reproduced in a plurality of displays, the method including: obtaining a display identifier for identifying that identifies the a position of a display among the plurality of displays, based on information on the an arrangement structure of the plurality of displays transmitted by the image reproduction control apparatus; obtaining an image segment to be reproduced in a display corresponding to the display identifier that identifies the position of the display among the plurality of displays, from the image; determining the an importance factor of the image segment based on at least one of the image and the viewing environment of the plurality of displays; generating an encoded image segment by encoding the image segment according to an encoding method corresponding to the importance factor of the image segment; and transmitting a bitstream including the display identifier, the importance factor and the encoded image segment to the image reproduction control apparatus.

The obtaining of the display identifier, the obtaining the image segment, the determining the importance factor, the generating the encoded image segment and the transmitting of the bitstream may be performed individually for each of the plurality of displays.

The importance factor may be determined cyclically once in a predetermined frame cycle.

The method may further include obtaining a position of an object provided in the image, wherein the importance factor is determined by analyzing whether the object is included in the image segment.

The method may further include detecting the position and eyes of a viewer watching the image, wherein the determining the importance factor of the image segment is determined based on the detected position and eyes of the viewer.

In the generating of an encoded image segment, the determining the importance factor may include determining the importance factor as high or low, wherein the generating the encoded image segment further comprises encoding the image segment by an encoding method with a high compression ratio and a high loss ratio in response to determining the importance factor as low, and encoding the image segment is encoded by an encoding method with a low compression ratio and a low loss ratio in response to determining the importance factor as high.

In the transmitting of the bitstream, the bitstream may further include at least one of audio data, caption data and additional data of the image may be transmitted, and the additional data may include data on at least one of the image, content related to the image, a channel providing the image and other channels available for selection other than the channel.

According to an aspect of another exemplary embodiment, there is provided an image transmitting apparatus for transmitting an image to an image reproduction control apparatus in order to reproduce the image in a plurality of displays, the image transmitting apparatus including: a controller configured to obtain a display identifier that identifies a position of a display among the plurality of displays, based on information on an arrangement of the plurality of displays transmitted by the image reproduction control apparatus, to obtain an image segment to be reproduced in a display corresponding to the display identifier that identifies the position of the display among the plurality of displays, from the image, to determine an importance factor of the image segment based on at least one of the image and the viewing environment of the plurality of displays, and to generate an encoded image segment by encoding the image segment according to an encoding method corresponding to the importance factor of the image segment; a receiving unit configured to receive the information on the arrangement of the plurality of displays from the image reproduction control apparatus; and a transmitter configured to transmit a bitstream including the display identifier, the importance factor, and the encoded image segment to the image reproduction control apparatus.

The controller may be configured to, individually for each of the plurality of displays, obtain of the display identifier, obtain an image segment, determine the importance factor and generate an encoded image segment, and the transmitter may be configured to, individually for each of the plurality of display, transmit a bitstream may be performed.

The controller may determine the importance factor of the image segment cyclically once in a predetermined frame cycle.

The controller may obtain the position of an object of contents provided by the image and determine the importance factor by analyzing whether or not the object is included in the image segment.

The controller may detect the position and eyes of a viewer watching the image and determines the importance factor by analyzing the position and eyes of the viewer.

The controller may be configured to determine the importance factor as high or low, and to encode the image segment by an encoding method with a high compression ratio and a high loss ratio in response to determining the importance factor as low, and to encode the image segment by an encoding method with a low compression ratio and a low loss ratio in response to determining the importance factor as high.

The bitstream may further include at least one of audio data, caption data and additional data of the image and the additional data may include data on at least one of the image, contents related to the image, a channel providing the image and other channels available for selection other than the channel.

According to an aspect of another exemplary embodiment, there is provided an image reproduction control method for controlling an image to be reproduced in a plurality of displays, the method including: obtaining a display identifier, an encoded image segment, and an importance factor from a bitstream received from an image transmission apparatus; decoding the encoded image segment, which is encoded according to an encoding method corresponding to the importance factor, according to a decoding method corresponding to the encoding method, and extracting from the image an image segment to be reproduced in a display corresponding to the display identifier among the plurality of displays, and restoring the image segment; determining a rendering method corresponding to the importance factor of the image segment, which is determined based on at least one of the image and an external environment of the plurality of displays; and transmitting the image segment with rendering information on the rendering method to a display corresponding to the display identifier which is generated based on the information on the arrangement of the plurality of displays in order to identify a position of the display among the plurality of displays.

The image reproduction control method may further include rendering the transmitted image segment in the display and reproducing the rendered image segment.

The image reproduction control method may further include obtaining caption data from the bitstream, and inserting caption included in the caption data into the image segment transmitted to the display corresponding to the display identifier in response to the obtained importance factor indicating a high importance.

The image reproduction control method may further include: obtaining audio data from the bitstream; and generating volume information on a volume level of the audio data to be reproduced by the display corresponding to the display identifier, wherein, the audio data and the volume information are transmitted with the image segment to the display.

The image reproduction control method may further include: obtaining from the bitstream additional data including information on at least one of the image, contents related to the image, a channel providing the image and other channels available for selection other than the channel; and transmitting the additional data to the display corresponding to the display identifier in response to the obtained importance factor indicating a low importance.

According to an aspect of another exemplary embodiment, there is provided an image reproduction control apparatus for controlling an image to be reproduced in a plurality of displays, the image reproduction control apparatus including: a controller configured to obtain a display identifier, an encoded image segment and an importance factor from a bitstream received from an image transmission apparatus, to decode the encoded image segment, which is encoded according to an encoding method corresponding to the importance factor, according to a decoding method corresponding to the encoding method, and extract from the image an image segment to be reproduced in a display corresponding to the display identifier among the plurality of displays, and restore the image segment, and to determine a rendering method corresponding to the importance factor of the image segment which is determined based on at least one of the image and an external environment of the plurality of displays; and a transmitter configured to transmit the image segment with rendering information on the rendering method to a display corresponding to the display identifier which is generated based on the information on the arrangement of the plurality of displays in order to identify a position of the display among the plurality of displays.

The apparatus may be connected to the display for reproducing the transmitted image segment.

The transmitter may simultaneously transmit rendered image segments of an identical frame to a plurality of displays so that image segments of an identical frame of an image are displayed simultaneously in the plurality of displays.

The controller may be configured to obtain caption data from the bitstream, and to insert a caption included in the caption data to the image segment transmitted to the display corresponding to the display identifier in response to the obtained importance factor indicating a high importance.

The controller may be configured to obtain audio data from the bitstream and to generate volume information on a volume level of the audio data to be reproduced by the display corresponding to the display identifier, and the transmitter is configured to transmit the audio data and the volume information to the display with the image segment.

The controller may be configured to obtain from the bitstream additional data including information on at least one of the image, content related to the image, a channel providing the image, and other channels available for selection other than the channel and, the transmitter is configured to transmit the additional data to the display corresponding to the display identifier in response to the obtained importance factor indicating a low importance.

According an aspect of another exemplary embodiment, there is provided a computer readable recording medium storing thereon a computer program for executing a method of transmitting an image to an image reproduction control apparatus so as to be reproduced in a plurality of displays, the method including: obtaining a display identifier for identifying that identifies the a position of a display among the plurality of displays, based on information on the an arrangement structure of the plurality of displays transmitted by the image reproduction control apparatus; obtaining an image segment to be reproduced in a display corresponding to the display identifier that identifies the position of the display among the plurality of displays, from the image; determining the an importance factor of the image segment based on at least one of the image and the viewing environment of the plurality of displays; generating an encoded image segment by encoding the image segment according to an encoding method corresponding to the importance factor of the image segment; and transmitting a bitstream including the display identifier, the importance factor and the encoded image segment to the image reproduction control apparatus.

According to an aspect of another exemplary embodiment, there is provided a computer readable recording medium storing thereon a computer program for executing an image reproduction control method for controlling an image to be reproduced in a plurality of displays, the image reproduction control method including: obtaining a display identifier, an encoded image segment, and an importance factor from a bitstream received from an image transmission apparatus; decoding the encoded image segment, which is encoded according to an encoding method corresponding to the importance factor, according to a decoding method corresponding to the encoding method, and extracting from the image an image segment to be reproduced in a display corresponding to the display identifier among the plurality of displays, and restoring the image segment; determining a rendering method corresponding to the importance factor of the image segment, which is determined based on at least one of the image and an external environment of the plurality of displays; and transmitting the image segment with rendering information on the rendering method to a display corresponding to the display identifier which is generated based on the information on the arrangement of the plurality of displays in order to identify a position of the display among the plurality of displays.

BRIEF DESCRIPTION OF THE DRAWINGS

The above and/or other aspects will become apparent and more readily appreciated from the following description of the exemplary embodiments, taken in conjunction with the accompanying drawings in which:

FIG. 10 is a flowchart of a method of transmitting an image according to an exemplary embodiment.

DETAILED DESCRIPTION

Figure 1:
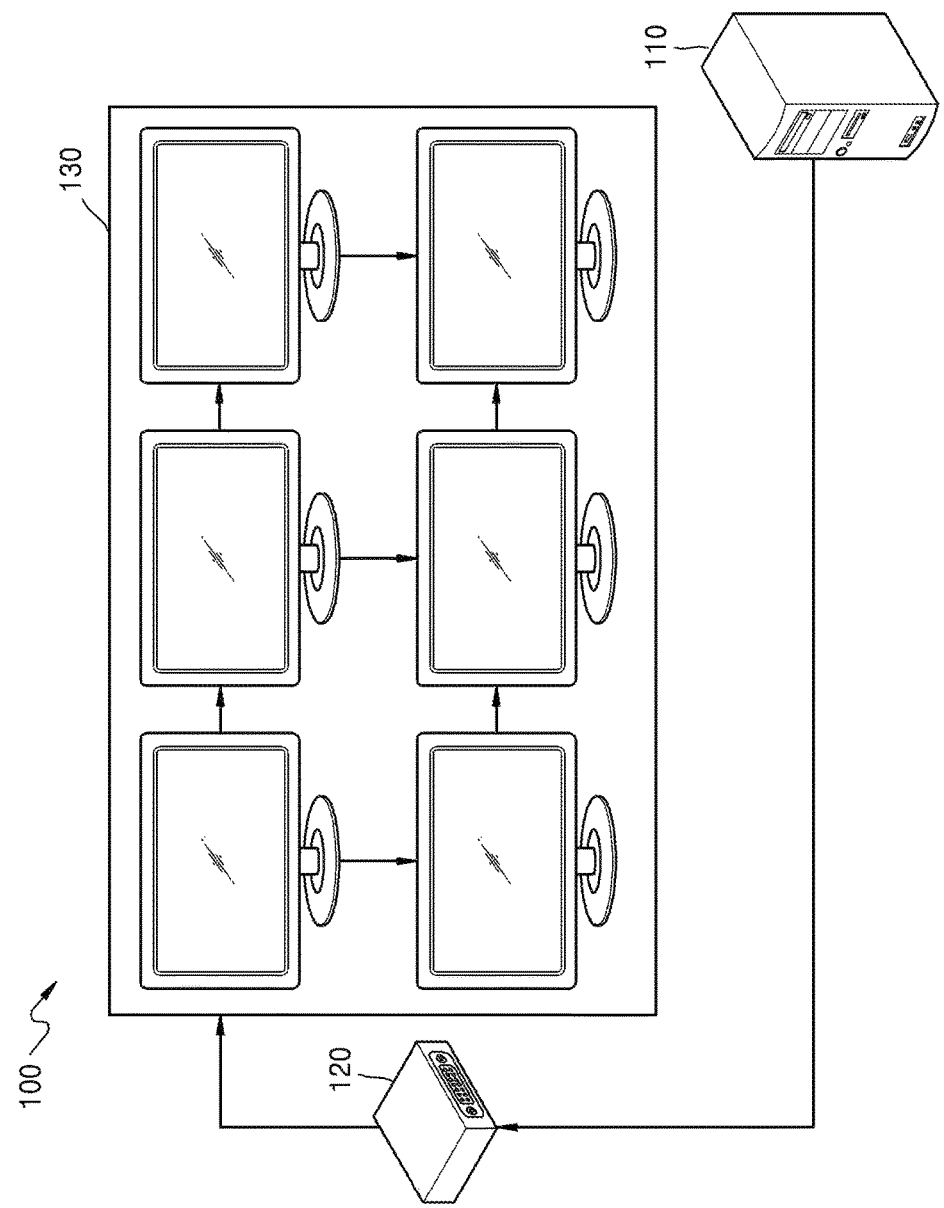
FIG. 1 is a diagram to explain a multi-display system in which an input image is reproduced in a plurality of displays.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram to explain a multi-display system in which an input image is reproduced in a plurality of displays. The multi-display system shown in FIG. 1 includes an image transmission apparatus 110, an image reproduction control apparatus 120 and a plurality of displays 130.

The image transmission apparatus 110, the image reproduction control apparatus 120 and the plurality of displays 130 in FIG. 1 are shown as physically separated from each other. However, the image transmission apparatus 110 may be embedded in the image reproduction control apparatus 120 or, conversely, the image reproduction control apparatus 120 may be embedded in the image transmission apparatus 110. Also, the image reproduction control apparatus 110 and the image transmission apparatus 120 may be embedded in one or more of the plurality of displays 130.

The image transmission apparatus 110 is shown in the form of a computer in FIG. 1, but is not limited to a computer and may be implemented as an electronic device with a computing function such as a server or a mobile device, or any other device capable of providing an image. The image transmission apparatus 110 is connected to the image reproduction control apparatus 120 and may transmit data to and receive data from the image reproduction control apparatus 120.

The image reproduction control apparatus 120 is shown in the form of a set-top box in FIG. 1, but is not limited to a set-top box and may be implemented as an electronic device with a computing function such as a personal computer, a server or a mobile device, or any other device capable of reproducing an image. The image reproduction control apparatus 120 is connected to the image transmission apparatus 110 and the plurality of displays 130, and may transmit data to and receive data from the image transmission apparatus 110 and the plurality of displays 130. The image reproduction control apparatus 120 is connected to one of the plurality of displays 130 in FIG. 1 and may be connected to two or more displays according to exemplary embodiments.

The plurality of displays 130 are connected to the image reproduction control apparatus 120 and may transmit data to and receive data from the image reproduction control apparatus 120. Only one display of the plurality of displays 130 is connected to the image reproduction control apparatus 120 as shown in FIG. 1 but two or more displays may be connected to the image reproduction control apparatus 120 according to exemplary embodiments. Displays are connected to each other in FIG. 1 and may exchange data. According to other exemplary embodiments, displays may not be connected to each other. When displays are connected to each other as shown in FIG. 1, connected displays may recognize each other as neighboring displays. Accordingly, through the connection structure between displays, the image reproduction control apparatus 120 may generate position information of each display.

The line connecting each element in FIG. 1 indicates each element is connected through communication. The connection line of FIG. 1 may be implemented as a wired feature or as a wireless feature. Each element is shown to be directly connected to each other in FIG. 1 but elements may be connected through a predetermined device according to an exemplary embodiment.

Figure 2:
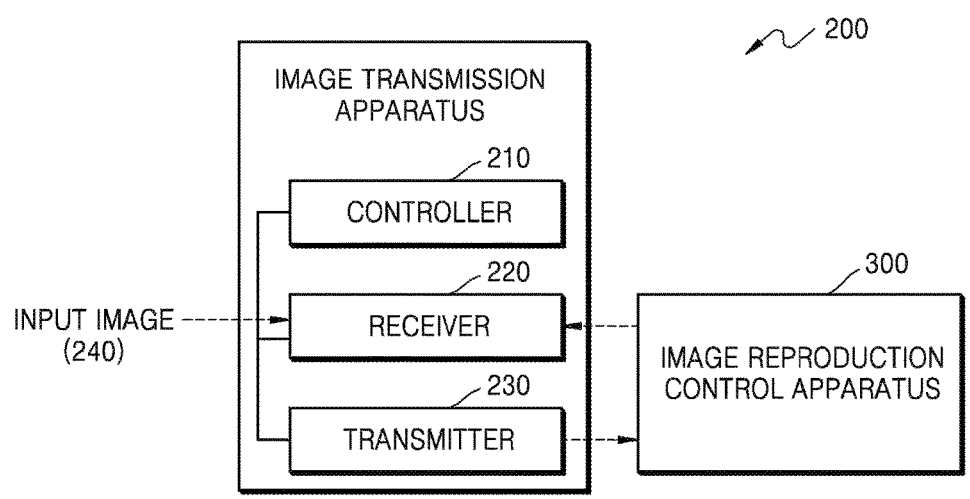
FIG. 2 is a block diagram of an image transmission apparatus according to an exemplary embodiment.

FIG. 2 is a block diagram of an image transmission apparatus 200 according to an exemplary embodiment.

The image transmission apparatus 200 may include a controller 210, a receiver 220 and a transmitter 230.

In FIG. 2, the receiver 220 and the transmitter 230 are shown as separate elements, but according to other exemplary embodiments, the receiver 220 and the transmitter 230 may be combined to be implemented as one identical element. Likewise, the controller 210 may also be implemented after being combined with at least one of the receiver 220 and the transmitter 230. In FIG. 2, the controller 210, the receiver 220 and the transmitter 230 are shown as elements provided inside the image transmission apparatus 200, but devices performing the functions of the controller 210, the receiver 220 and the transmitter 230 do not need to be provided physically adjacent to each other. According to exemplary embodiments, the controller 210, the receiver 220 and the transmitter 230 may be dispersed. The image transmission apparatus 200 of FIG. 2 is not limited to a physical apparatus. For example, some of functions of the image transmission apparatus 200 may be implemented not by hardware but by software, or by a combination of hardware and software.

The controller 210 obtains a display identifier for identifying the size and position of one display among a plurality of displays, based on information on the arrangement structure of the plurality of displays. Then, from an input image, the controller 210 generates each image segment to be reproduced in a current display corresponding to the display identifier among the plurality of displays 130. Next, by analyzing at least one of the input image and the viewing environment of the plurality of displays 130, the controller 210 determines the importance factor of each image segment. Then, according to an encoding method corresponding to the importance factor of each image segment, the controller 210 encodes each image segment and thus generates encoded image segments.

Identification information of each display, which is obtained by the controller 210, includes information on the size and position of one of the plurality of displays. Based on the display identifier, the encoded image segment may be transmitted to a display in which the encoded image segment should be reproduced. A display identifier may be generated based on device information of a display and information on a connection state between displays. According to exemplary embodiments, a display identifier may be generated based on a value arbitrarily determined by an operator of the multi-display system 100.

An image segment extracted by the control unit 210 is extracted from the input image 240. The input image 240 is received by the receiver 220, which will be explained in greater detail below in connection with the receiver 220. In order to generate an image segment, the controller 210 extracts a portion of the image that will be displayed on a display corresponding to a display identifier, from the input image 240. For example, when an image segment is obtained based on the display identifier corresponding to display 610 in the multi-display shown in FIG. 6A, the controller 210 extracts an image at the bottom left end of nine identically divided parts of an input image (i.e., the bottom left of the 3×3 array). Likewise, when an image segment is generated based on the display identifier corresponding to a display 620, the controller 210 may extract an image at the middle right of the nine identically divided parts of the input image.

After obtaining an image segment from an input image, the controller 210 determines the importance factor of the image segment.

The controller 210 may determine the importance factor cyclically once in a predetermined frame cycle. For example, if the predetermined frame cycle is 30 frames, the importance factor is determined once for each 30 frames. As a change in the importance factor causes a change of an encoding method, if the cycle for determining the importance factor is too short, the compression efficiency may be rather deteriorated. Also, due to the operations required for determining the importance factor, the speed of the multi-display system 100 may be lowered. Conversely, if the cycle for calculating the importance factor is too long, the multi-display system 100 may not quickly respond to changes in the content of the input image 240 and in the viewing environment of the plurality of displays 130. Accordingly, the cycle for determining the importance factor should be set appropriately according to the computation capability of the multi-display system 100.

According to the importance factor of an image segment determined by the controller 210, the encoding method and rendering method of the image segment are determined. Accordingly, the picture quality and audio visual effects of the image segment to be reproduced in a display may vary according to the importance factor. The encoding method and rendering method corresponding to the importance factor will be explained in greater detail below.

The controller 210 may determine the importance factor of an image segment by analyzing the input image 240. A part in the input image 240 on which a viewer's eyes are primarily focusing on is an object of the content provided in the input image 240. Accordingly, the controller 210 may obtain the position of the object of the content provided in the input image 240. Then, the controller 210 may determine the importance factor based on whether or not an object is included in a particular image segment.

Figure 6A:
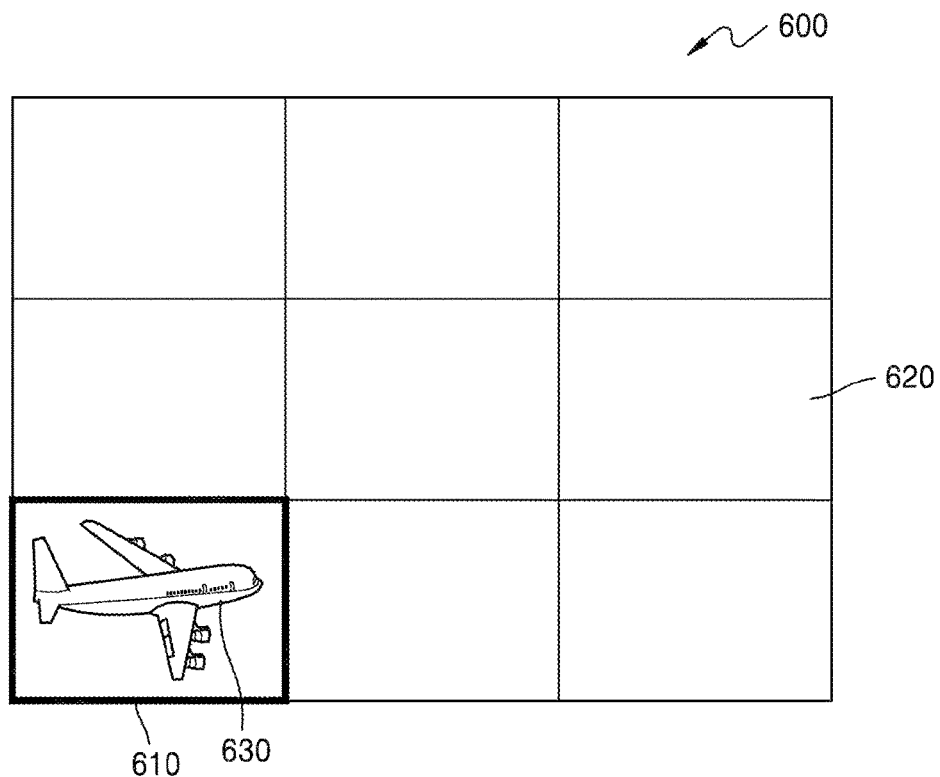
FIGS. 6A and 6B are diagrams to explain a method of determining importance factor primarily based on an object of contents according to an exemplary embodiment.
Figure 6B:
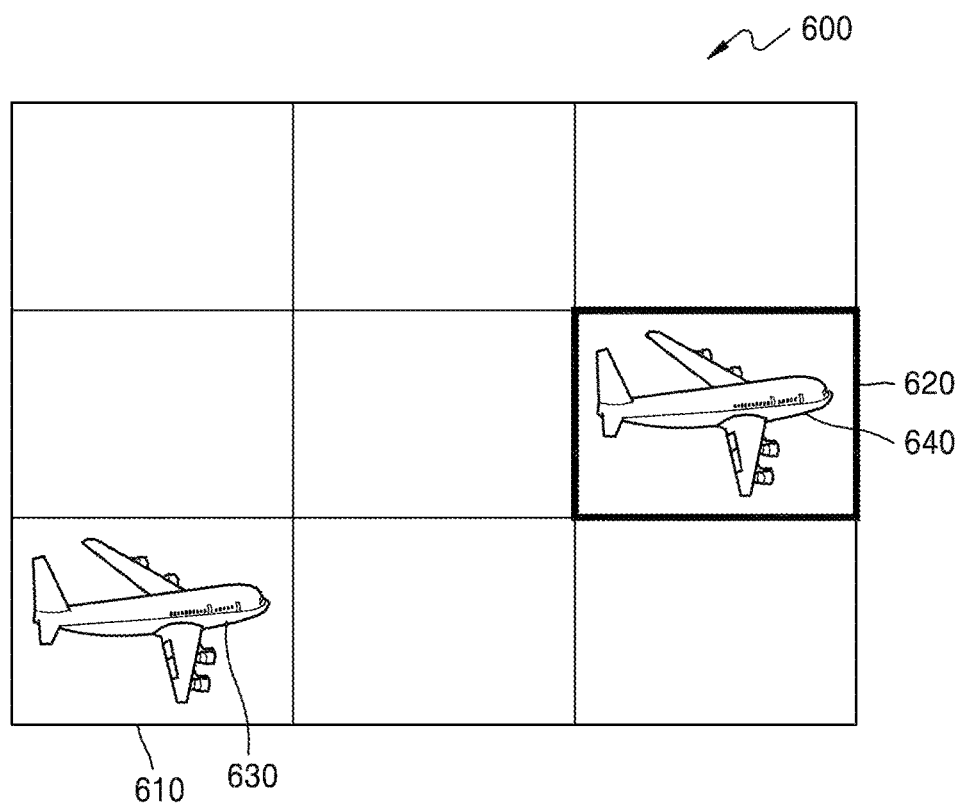

FIGS. 6A and 6B are showing an example of a method of determining the importance factor according to an object of the content.

According to FIGS. 6A and 6B, the display arrangement structure of the multi-display system is in the form of a 3×3 array. Accordingly, the controller 210 divides an input image according to the display arrangement structure having a 3×3 shape.

In FIG. 6A, an airplane 630, which is an object in the content, appears at the bottom left part of an input image 600. Accordingly, the controller 210 determines the importance factor of the image segment 610 corresponding to the bottom left part of the input image 600 to be higher than those of the other image segments. If an input image is reproduced and an airplane which is an object in the content appears at the middle right part of the input image as shown in FIG. 6B, the controller 210 determines the importance factor of the image segment 620 corresponding to the middle right part of the input image 600 to be higher than those of the other image segments.

A variety of methods for detecting an object in the content may be applied in the exemplary embodiments, which are not limited to predetermined detection methods.

The controller 210 may determine the importance factor of an image segment by analyzing a viewing environment of the plurality of displays 130. For example, the controller 210 may determine the importance factor by analyzing the position and eyes of a viewer directly watching the input image 240. For example, the controller 210 may determine the importance factor by determining the part in the input image 240 on which the viewer's eyes are primarily focusing on. By determining that the viewer is focused primarily on one part of the image (e.g., a portion of the image displayed on a particular display among the plurality of displays), the importance factor for the corresponding image segment can be determined to be high, while portions of the image that the viewer is not focused on may be determined to be low.

Figure 7A:
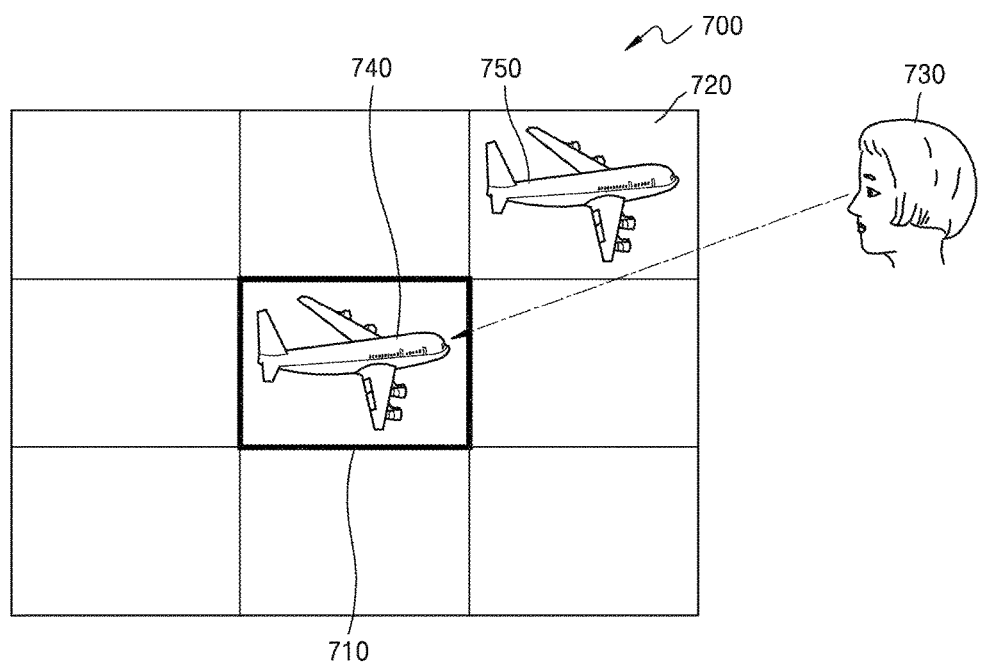
FIGS. 7A and 7B are diagrams to explain a method of determining importance factor primarily based on a viewing environment of a plurality of displays according to an exemplary embodiment.
Figure 7B:
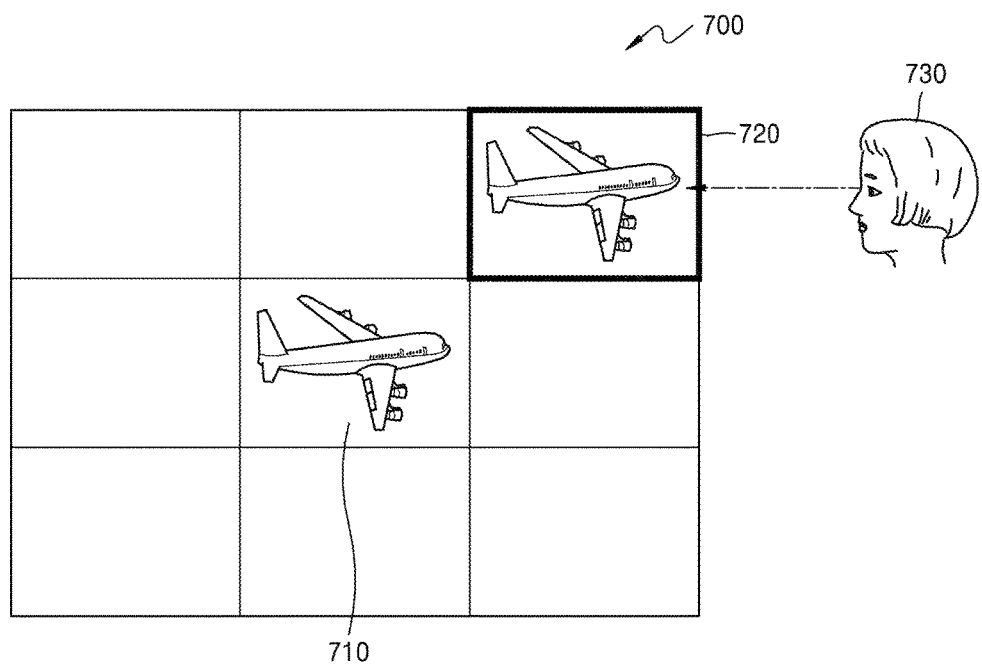

FIGS. 7A and 7B show detailed examples of a method of determining the importance factor according to a viewing environment. In FIGS. 7A and 7B, as in FIGS. 6A and 6B, the controller 210 also divides an input image according to the 3×3 display arrangement structure.

In FIGS. 7A and 7B, there are two airplanes which are objects in the content of the input image 700. An airplane 740 appears at the center and the other airplane 750 appears on the top right part of the input image 700. In FIG. 7A, the viewer 730 is looking at the airplane 740. Accordingly, the controller 210 determines the importance factor of the image segment 710 corresponding to the center part of the input image 700 where the airplane 740 is positioned, to be higher than other image segments including the image segment 720. If the viewer is looking at the airplane 750 as shown in FIG. 7B, the controller 210 determines the importance factor of the image segment 720 corresponding to the top right part of the input image 700, to be higher than other image segments including the image segment 710.

A variety of methods for determining the position and eyes of a viewer may be applied according to exemplary embodiments, which are not limited to predetermined methods for performing the determining.

The controller 210 may determine the importance factor by combining the result obtained by analyzing the input image 240 and the result obtained by analyzing the viewing environment surrounding a plurality of displays.

After determining the importance factor of an image segment, the controller 210 may encode the image segment according to an encoding method corresponding to the importance factor of the image segment, thus generating an encoded image segment. Generally, when the compression ratio of an encoding method is high, the loss ratio of the data is relatively high. Conversely, when the compression ratio of an encoding method is low, the loss ratio of the data is relatively low. Therefore, an image segment with a high importance factor is encoded by an encoding method with a low compression ratio in order to lower the loss ratio of the data. As a high loss ratio of data is allowed for an image segment with a low importance factor, the image segment is encoded by an encoding method with a high compression ratio in order to reduce the size of the data.

The controller 210 may apply an encoding method matching with a still image standard codec such as JPEG and JPEG2000, or a moving picture compression standard codec such as MPEG-1, MPEG-2/H.262, MPEG-4, MPEG-4 AVC/H.264, HEVC, AVS and VP8, or other compression standards. Also, the controller 210 may also apply its own non-standard encoding method appropriate to a predetermined input image.

Operations of the controller 210 may be executed by one processor. However, according to other exemplary embodiments, the operations of the controller 210 may be performed in two or more processors distributed according to processes. For example, a process for obtaining a display identifier may be performed by a first processor and the other processes may be performed by a second processor. Accordingly, controller 210 may be implemented in a variety of forms, and in hardware, software, or a combination of both according to different exemplary embodiments.

The receiver 220 may receive the input image 240. The input image 240 may be an image received through an external network such as the Internet or a local area network (LAN). Also, the input image 240 may be an image extracted from images stored in a storage medium such as a compact disc (CD) and digital versatile disc (DVD). In addition, the receiver 220 is not restricted to receiving the input image 240 by any particular method and in other exemplary embodiments different receiving methods may be utilized.

Also, together with the input image 240, the receiver 220 may receive audio data, caption data and additional data added to the input image 240. The additional data may include data on at least one of an input image, contents related to an input image, a channel providing an input image, other channels available for selection other than the channel, or other data.

Also, the receiver 220 may receive information on the arrangement structure of the plurality of displays 130 from the image reproduction control apparatus 300. The information on the arrangement structure of the plurality of displays 130 includes information on the position and size of each display of the plurality of displays 130. Based on the information on the arrangement structure of the plurality of displays 130 received in the receiver 220, the controller 210 generates a display identifier.

The transmitter 230 may transmit to the image reproduction control apparatus 300 a bitstream including a display identifier, the importance factor and an encoded image segment. The bitstream may further include at least one of audio data, caption data, and additional data.

For each of the plurality of displays 130, the controller 210 generates a display identifier, extracts an image segment, determines an importance factor and generates an encoded image segment. Accordingly, from the input image 240, the controller 210 generates a plurality of encoded image segments corresponding to the plurality of displays 130, respectively. Then, the transmitter 230 transmits to the image reproduction control apparatus 300 a bitstream including encoded image segments, a display identifier corresponding to the plurality of image segments, and the importance factors. The structure of a bitstream will be explained below with reference to FIG. 5.

Figure 3:
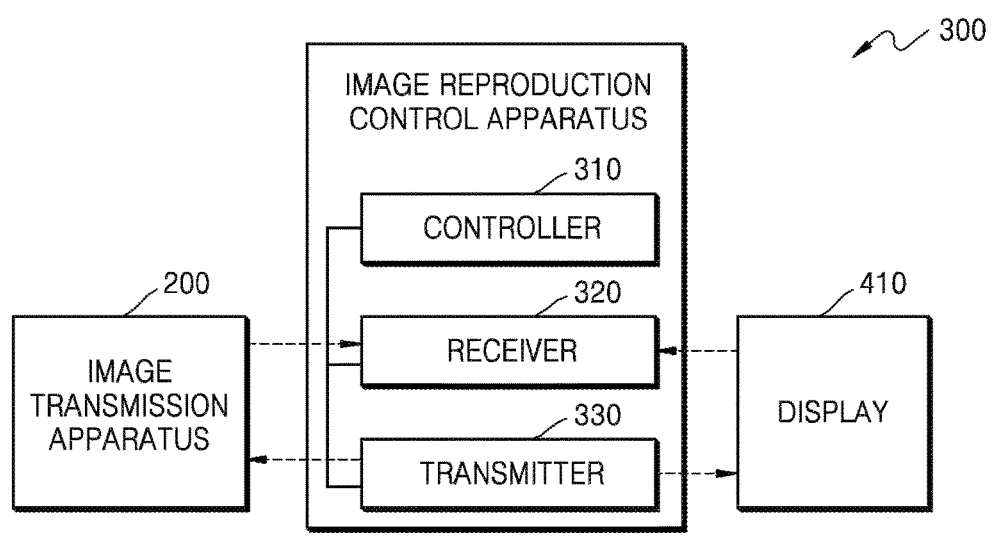
FIG. 3 is a block diagram of an image reproduction control apparatus according to an exemplary embodiment.

FIG. 3 is a block diagram of an image reproduction control apparatus according to an exemplary embodiment.

The image reproduction control apparatus 300 may include a controller 310, a receiver 320 and a transmitter 330.

In FIG. 3, the receiver 320 and the transmitter 330 are shown as separate elements, but according to other exemplary embodiments, the receiver 320 and the transmitter 330 may be combined to be implemented as a single element. Likewise, the controller 310 may also be implemented after being combined with at least one of the receiver 320 and the transmitter 330. In FIG. 3, the controller 310, the receiver 320 and the transmitter 330 are shown as elements provided inside the image reproduction control apparatus 300, but devices performing the operations of the controller 310, the receiver 320 and the transmitter 330 do not need to be provided physically adjacent to each other. According to exemplary embodiments, the controller 310, the receiver 320 and the transmitter 330 may be located separate from each other. Further, the image reproduction control apparatus 300 of FIG. 3 is not limited to a physical apparatus. For example, some of operations of the image reproduction control apparatus 300 may be implemented not by hardware but by software, or a combination of hardware and software.

Based on information on the size and position of each of a plurality of displays 130, the controller 310 may generate information on the arrangement structure of the plurality of displays 130.

The generated information on the arrangement structure is transmitted to the image transmission apparatus 200 by the transmitter 330.

The information on the arrangement structure is used to generate a display identifier in the image transmission apparatus 200.

The controller 310 obtains display identifiers, importance factors and encoded image segments from the bitstream received in the receiver 320. When audio data, caption data and additional data are included in the bitstream, the controller 310 may further obtain audio data, caption data and additional data. The display identifiers, importance factors and encoded image segments obtained by controller 310 are identical to the display identifiers, importance factors and encoded image segments, respectively, which are generated in the image transmission apparatus 200. Likewise, the audio data, caption data and additional data obtained by controller 310 are also identical to the audio data, caption data and additional data included in the bitstream transmitted by the image transmission apparatus 200.

The controller 310 restores an image segment by decoding an encoded image segment by performing a decoding method corresponding to the encoding method.

First, as the controller 210 of the image transmission apparatus 200 encodes an image segment by an encoding method corresponding to the importance factor, the controller 210 may determine the encoding method of the encoded image segment from the importance factor. Also, information on the encoding method of an encoded image segment may be included in the bitstream including the encoded image segment. The controller 310 may also extract information on the encoding method from the bitstream.

After determining the encoding method of an encoded image segment, the controller 310 determines a decoding method corresponding to the encoding method.

Like the encoding method, the decoding method may match with a still image standard codec such as JPEG and JPEG2000, or a moving picture compression standard codec such as MPEG-1, MPEG-2/H.262, MPEG-4, MPEG-4 AVC/H.264, HEVC, AVS and VP8 or other standard method. Also, when the encoding method is a non-standard encoding method, the decoding method may also be a non-standard decoding method corresponding to the encoding method. Information on the decoding method may be stored in the image reproduction control apparatus 300. Also, information on the decoding method may be included in the bitstream including the encoded image segment.

If the decoding method is determined, the controller 310 restores an image segment by decoding an encoded image segment according to the decoding method.

The controller 310 determines a rendering method corresponding to the importance factor.

The rendering method may include not only a method of processing the picture quality of an image, but also data processing methods for changing or transforming images and data related to images, such as inserting a related image or letters into an image and changing sound data related to an image.

As it is more likely that a view watches an image segment with a high importance factor, the controller 310 may vary a rendering method of an image segment according to the importance factor. For example, according to the importance factor, the controller 310 may determine which image segment a caption is to be placed in. Also, according to the importance factor, the control unit may allow adjustment of the volume level of sound output to be reproduced in a display. Also, according to the importance factor, additional data instead of an image segment may be displayed in a display.

Figure 8A:
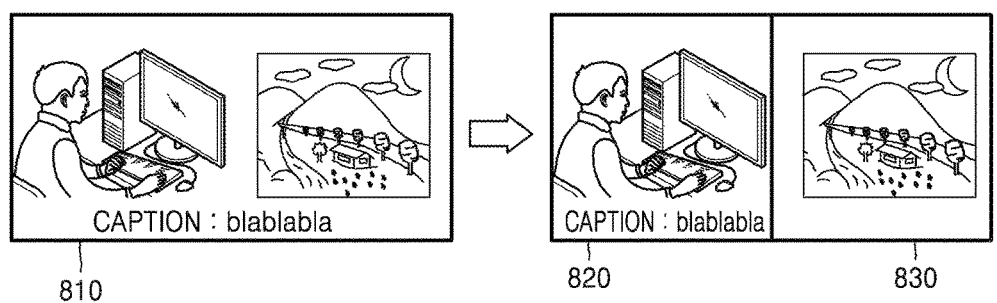
FIGS. 8A and 8B are diagrams to explain a visual rendering method according to an exemplary embodiment.
Figure 8B:
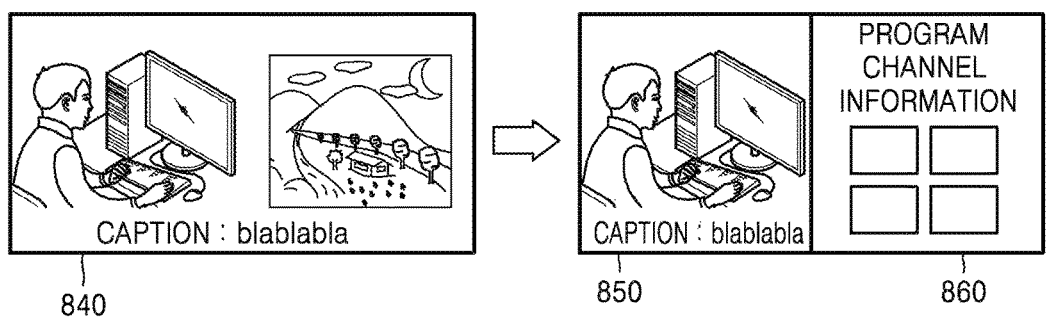
Figure 9A:
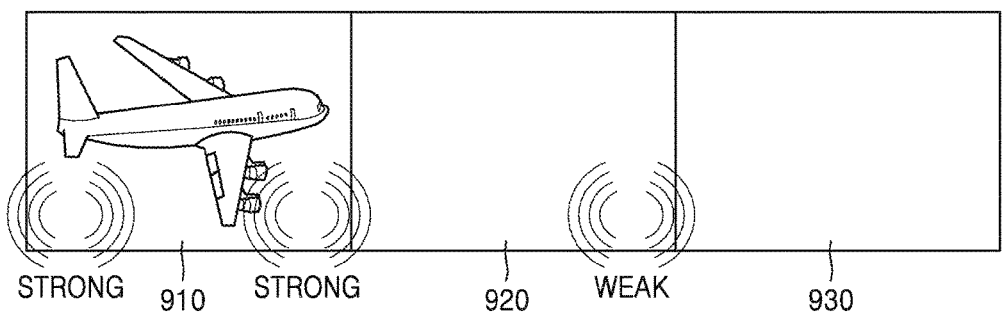
FIGS. 9A through 9C are diagrams to explain an audio rendering method according to an exemplary embodiment.
Figure 9B:
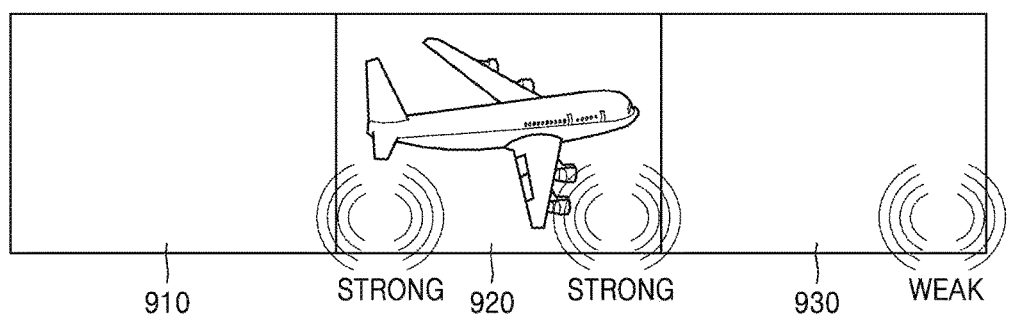
Figure 9C:
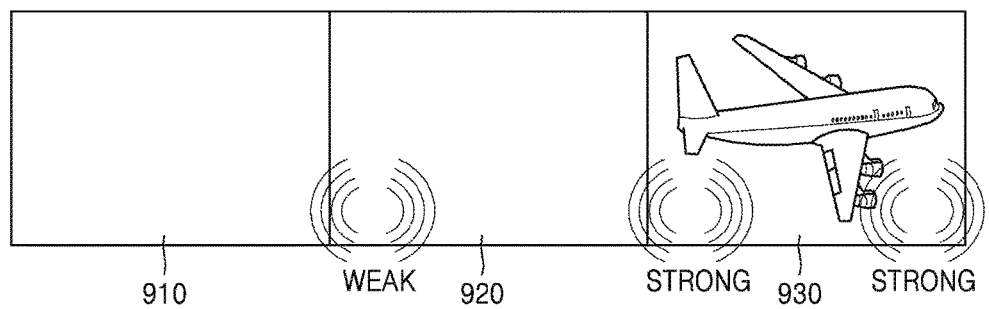

FIGS. 8A through 9C show detailed examples of applying a rendering method according to exemplary embodiments. FIGS. 8A and 8B are diagrams to explain a visual rendering method, and FIGS. 9A through 9C are diagram to explain an audio rendering method.

FIG. 8A is a diagram to explain a rendering method for providing a caption included in caption data together with an input image. In the input image 810 of FIG. 8A, a person is shown on the left-hand side and a picture with a background of a rural area is shown on the right-hand side. In the left display 820 of FIG. 8A, an image segment including the person is shown and in the right display 830, a picture with a background of a rural area is shown. It is assumed that the person on the left-hand side of the input image 810 is a more important object than the picture on the right-hand side. Under this assumption, the importance factor of the image segment to be transmitted to the left display 820 is higher than that of the image segment to be transmitted to the right display 830.

At the bottom of the input image 810, a caption is shown. When the caption is displayed in an image segment without rendering, the size obtained by adding the displays 820 and 830 is bigger than the viewing angle area of the viewer, and it is difficult for the viewer to read the caption. In particular, the eyes of the viewer mainly focus on the left display 820 in which the image segment with a higher importance factor is reproduced, and it is difficult to read a part of the caption included in the image segment with a lower importance factor displayed in the right display 830. Accordingly, it is necessary to place the caption only in the image segment with a higher importance factor so that the viewer easily reads the caption. Therefore, the caption is inserted only in the image segment with a higher importance factor that is reproduced in the left display 820.

In short, the controller 310 may apply a rendering method by which the caption included in the caption data is inserted into the image segment with a higher importance factor and is not inserted into the image segment with a lower importance factor. As a result, the viewer can easily read the caption because of the rendering method for the caption.

FIG. 8B is a diagram to explain a rendering method for providing information included in additional data together with an input image. In the input image 840 of FIG. 8B, a person is shown on the left-hand side and a picture with a background of a rural area shown on the right-hand side. In the left display 850 of FIG. 8B, an image segment including the person is shown, and in the right display 860 program channel information is shown. If it is assumed that the person shown on the left-hand side of the input image 840 is a more important object than the picture on the right-hand side, the importance factor of the image segment to be transmitted to the left display 850 is higher than that of the image segment to be transmitted to the right display 860.

When it is assumed that the bitstream of FIG. 8B includes program channel information, the controller 310 may provide program channel information of an input image which is being reproduced for the viewer, by displaying additional data on one display of the plurality of displays 130. If additional data is displayed on the left display 850 in which the image segment with a higher importance factor is reproduced, the content of the input image is not smoothly delivered to the viewer. Accordingly, instead of an image segment with a lower importance factor, additional data is displayed on the right display 860 to which the image segment with a lower importance factor is transmitted. In FIG. 8B, the additional data is displayed on the entire viewing area of the right display 860, but according to other exemplary embodiments the additional data may also be displayed on only a part of the right display 860.

In short, when additional data is included in a bitstream, the additional data may be displayed on a display that receives an image segment with a lower importance factor among the plurality of displays 130. Accordingly, while displaying an important object of the contents included in an input image for viewers, the controller 310 may deliver the additional data to viewers.

FIGS. 9A through 9C are diagrams to explain a rendering method for audio data which is provided together with an input image according to an exemplary embodiment. Three displays 910, 920 and 930 are shown in FIGS. 9A through 9C. In FIG. 9A, an airplane is included in an image segment reproduced in the left display 910. In FIG. 9B, an airplane is included in an image segment reproduced in the middle display 920. In FIG. 9C, an airplane is included in an image segment reproduced in the right display 930.

In FIGS. 9A through 9C, the controller 320 determines that an image segment including an airplane is one with a higher importance factor. Accordingly, in FIG. 9A, the importance factor of the image segment reproduced in the left display 910 is the highest. Likewise, the importance factor of the image segment reproduced in the middle display 920 is the highest in FIG. 9B and the importance factor of the image segment reproduced in the right display 930 is the highest in FIG. 9C.

The controller 320 may set the volume level of audio data to be reproduced in a display reproducing an image segment with a higher importance factor, to be higher than those to be reproduced in other displays. Accordingly, with the changing position of an object included in the contents, the viewer may feel a change in the position from which a sound is generated. For example, the volume level of the left display 910 is the highest in FIG. 9A. In FIG. 9B, the volume level of the middle display 920 is the highest. Likewise, in FIG. 9C, the volume level of the right display 930 is the highest. Accordingly, a sound effect is generated as if an airplane travels from the left-hand side to the right-hand side as time passes.

In short, when audio data is included in a bitstream, the volume of audio data to be reproduced in a display corresponding to an image segment is determined by the importance factor of the image segment. Accordingly, the control unit 310 may provide a sound effect to viewers by adjusting the volume of audio data to be reproduced in a display.

According to exemplary embodiments, the controller 320 may use other rendering methods other than the rendering method suggested in FIGS. 8A through 9C. Accordingly, the exemplary embodiments are not limited by the rendering method suggested in FIGS. 8A through 9C.

The receiver 330 receives from the image transmission apparatus 200 a bitstream including display identifiers, importance factors and encoded image segments. The bitstream may include audio data, caption data and additional data. Also, the receiver 330 may receive the size and position of each display from the plurality of displays 130.

The transmitter 330 may transmit a rendered image segment to a display corresponding to a display identifier. Also, the transmitter 300 may transmit information on the arrangement structure of displays to the image transmission apparatus 200.

Figure 4A:
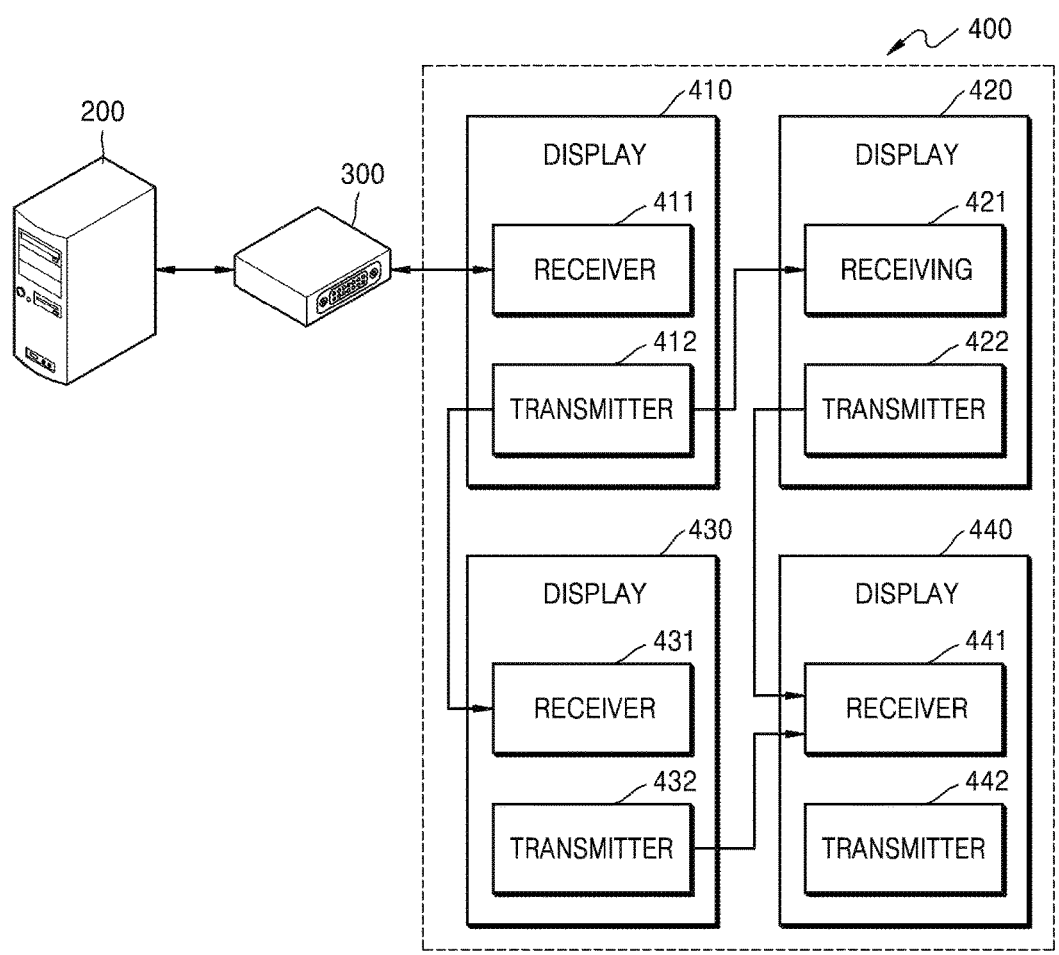
FIGS. 4A through 4B are block diagrams of a multi-display system according to an exemplary embodiment.
Figure 4B:
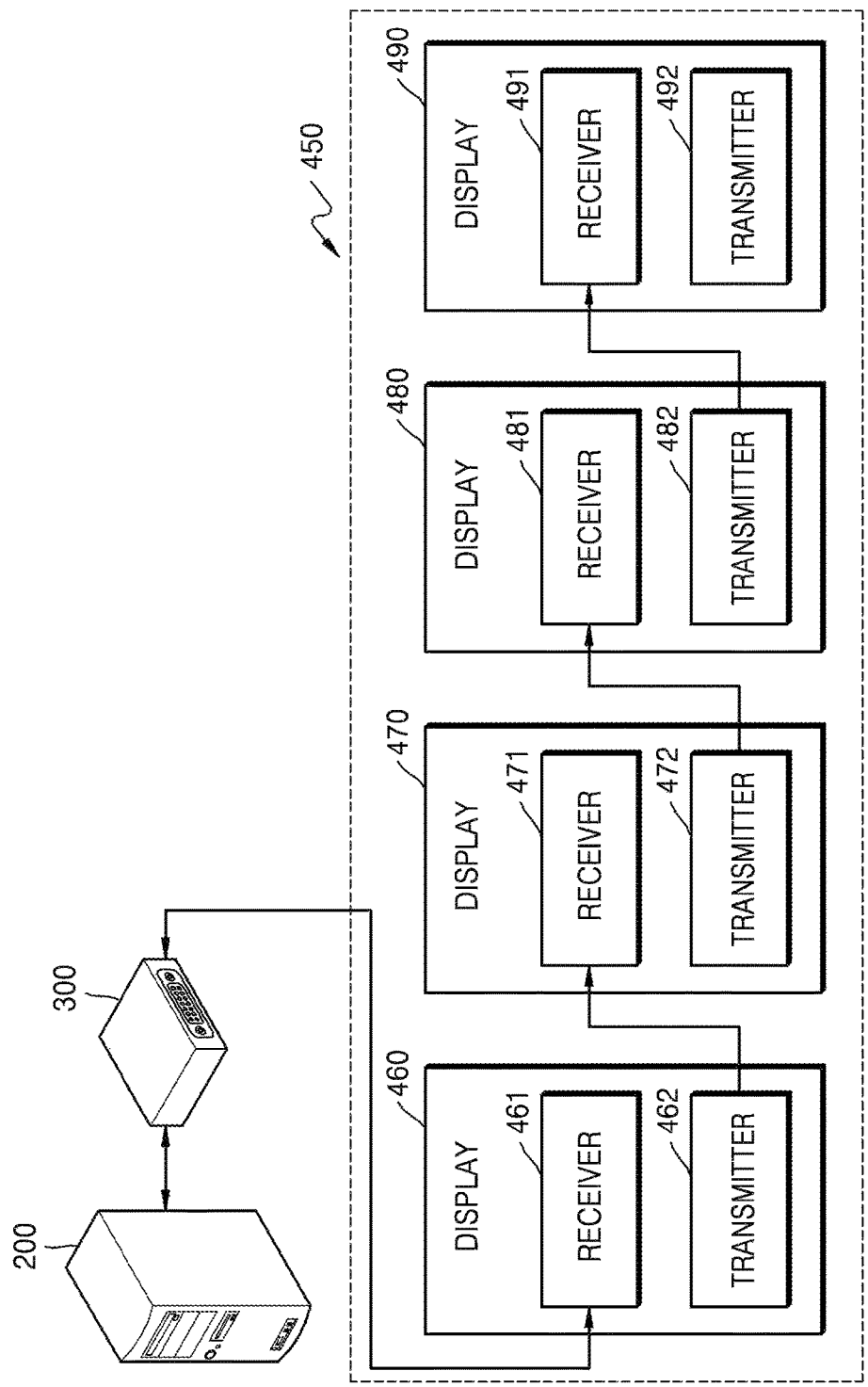

FIGS. 4A and 4B are block diagrams of a method for connecting a plurality of displays in a multi-display system according to an embodiment.

In a multi-display system, a plurality of displays are connected and a display arrangement structure may be determined according to a connected structure. In FIG. 4A, displays are arranged in tile format and in FIG. 4B, displays are arranged in a panorama format.

A bitstream is transmitted between connected displays. If a bitstream including a display identifier corresponding to a display is received, the display renders and displays an image segment included in the bitstream. If a bitstream including a display identifier not corresponding to the display, the display transmits the bitstream to other displays connected to the display.

Also, electric power may be transmitted in a wired or wireless manner between connected displays. For example, electric power may be transmitted from the image reproduction control apparatus 300 to a plurality of displays. Also, electric power may be transmitted from one or more displays among a plurality of displays to other displays. Accordingly, it is not necessary to connect all displays directly to a power line.

In FIG. 4A, a plurality of displays 400 are connected in a tile arrangement. A display 410 directly connected to the image reproduction control apparatus 300 may be placed on the top left corner among the plurality of displays 400. Each display receives a bitstream from a left-hand side display and an upper display and transmits a bitstream to a right-hand side display and a lower display. For example, the display 410 receives a bitstream from the image reproduction control apparatus 300 through a receiver 411. When the received bitstream does not include the display identifier corresponding to the display 410, a transmitter 412 transmits the received bitstream to the receiver 421 of the right-hand side display 420 or the receiver 431 of the lower display 430 according to the display identifier included in the bitstream. In this manner, the bitstream is transmitted from the display 410 on the top left corner to the display 440 on the bottom right corner until a display corresponding to the display identifier included in the bitstream is found.

In FIG. 4B a plurality of displays 450 are connected in a panorama arrangement. The display 460 directly connected to the image reproduction control apparatus 300 may be placed on the left end of the plurality of displays 450. Each display receives a bitstream from a left-hand side display and transmits a bitstream to a right-hand side display. The display 460 receives a bitstream from the image reproduction control apparatus 300 through a receiver 461. When the received bitstream does not include the display identifier corresponding to the display 460, the bitstream is transmitted to the receiver 471 of the right-hand side display 470 by a transmission unit 462 according to the display identifier included in the bitstream. In this manner, the bitstream is transmitted from the left-end display 460 to the right-end display 490 until a display corresponding to the display identifier included in the bitstream is found.

The structures shown in FIGS. 4A and 4B are merely exemplary, and a plurality of displays may be connected in arrangements other than those depicted in FIGS. 4A and 4B. Also, according to exemplary embodiments, an image reproduction control apparatus may be connected to two or more displays, unlike the connection depicted in FIG. 4A or 4B.

Accordingly, the exemplary embodiments are not limited to the embodiments shown in FIGS. 4A and 4B.

Figure 5:
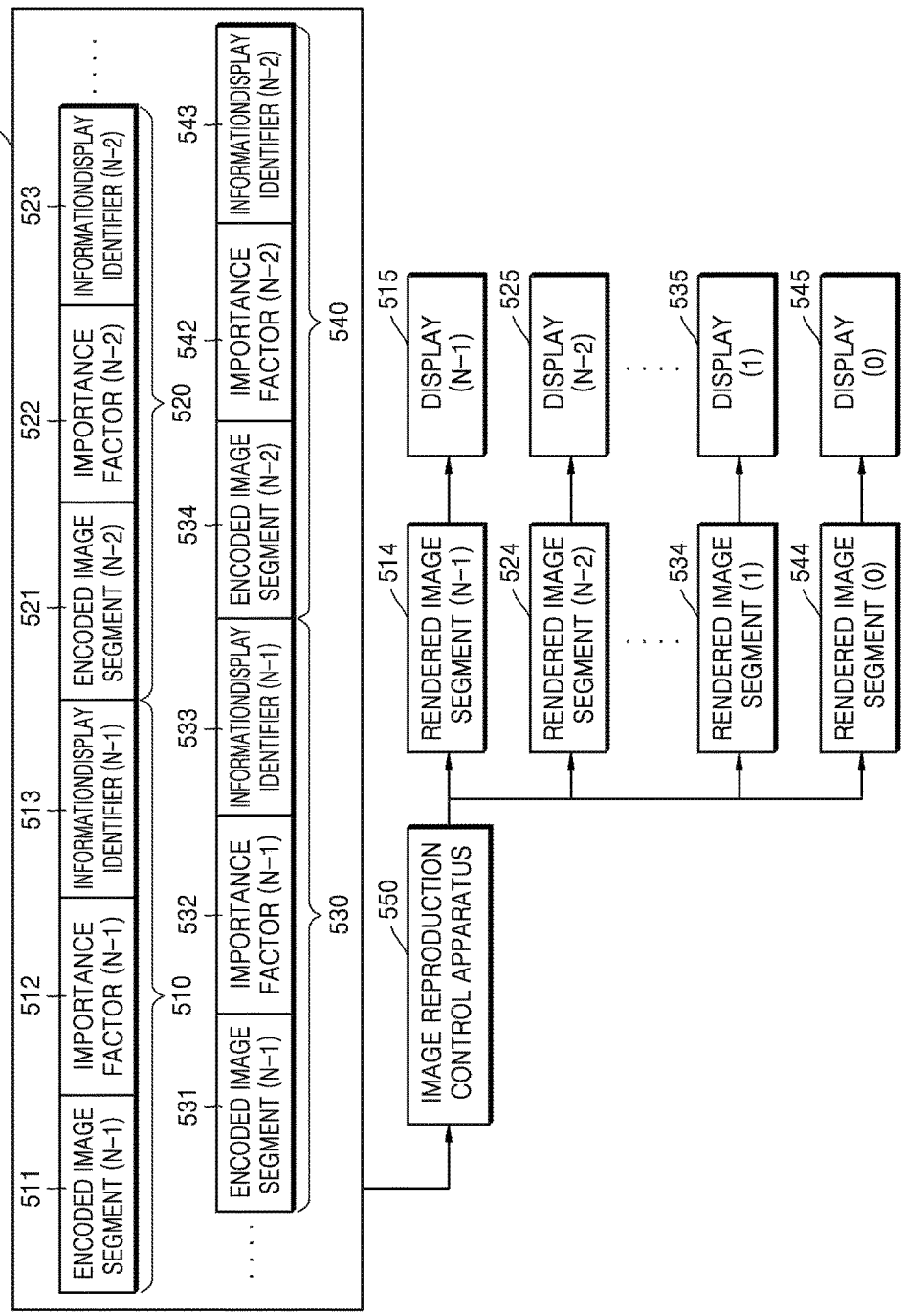
FIG. 5 is a diagram to explain a structure of a bitstream transmitted in a multi-display system and a method for processing the bitstream according to an exemplary embodiment.

FIG. 5 is a diagram to explain the structure of a bitstream 500 transmitted in a multi-display system including N displays and a processing method therefor according to an exemplary embodiment.

For convenience of explanation, the bitstream 500 of FIG. 5 will be referred to as a first bitstream and bitstreams 510 through 540 included in the bitstream 500 will be referred to as second bitstreams. The second bitstream is a bitstream including an encoded image segment, the importance factor, and a display identifier for one of the plurality of displays, and the first bitstream is a bitstream in which the second bitstreams are connected in series.

The image reproduction control apparatus 550 of FIG. 5 may perform the same functions as those of the image reproduction control apparatus 300 of FIG. 3.

In FIG. 5, only four second bitstreams 510 through 540 are shown for convenience of explanation, but the first bitstream 500 includes a total of N second bitstreams. The second bitstream 510 includes an encoded image segment 511, the importance factor 512 and the display identifier 513 corresponding to a display (N−1). Likewise, the second bitstream 520 includes an encoded image segment 521, the importance factor 522 and the display identifier 523 corresponding to a display (N−2) and the second bitstream 530 includes an encoded image segment 531, the importance factor 532 and the display identifier 533 corresponding to a display (1). Also, the second bitstream 540 includes an encoded image segment 541, the importance factor 542 and the display identifier 543 corresponding to a display (0).

The image reproduction control apparatus 550 divides the first bitstream 500 into N second bitstreams. Then, the image reproduction control apparatus 550 extracts the importance factor from each second bitstream and determines a decoding and rendering method of the encoded image segment according to the importance factor. Then, a rendered image segment is transmitted to a display corresponding to the display identifier. For example, rendered image segments 514, 524, 534 and 544 are generated from the second bitstreams 510, 520, 530 and 540, respectively.

In FIG. 5, the image reproduction control apparatus 550 and each display 515, 525, 535 and 545 are directly connected and therefore a rendered image segment is transmitted directly to a display corresponding to the display identifier. However, when the image reproduction control apparatus 550 is connected to only one display as shown in FIGS. 4A and 4B, the image reproduction control apparatus 550 may transmit a rendered image segment to which the display identifier is added, so that the rendered image segment can be transmitted to an appropriate display.

FIG. 10 is a flowchart of a method 1000 of transmitting an image in which an input image 240 is transmitted to an image reproduction control apparatus 300 so as to be reproduced in a plurality of displays 130.

In operation S1010, based on information on the arrangement structure of the plurality of displays 130 transmitted by the image reproduction control apparatus 300, a display identifier for identifying the size and position of one display among the plurality of displays 130 is obtained.

In operation S1020, an image segment to be reproduced in a display corresponding to the display identifier among the plurality of displays 130 is extracted from the input image 240.

In operation S1030, the importance factor of an image segment is determined by analyzing the input image 240 and the viewing environment of the plurality of displays 130. The importance factor is determined cyclically once in a predetermined number of frames. The importance factor may be determined by analyzing whether or not an object is included in an image segment. The importance factor may be determined by analyzing the position and eyes of the viewer.

In operation S1040, an encoded image segment is generated by encoding an image segment by an encoding method corresponding to the importance factor. When the importance factor is low, the image segment is encoded by an encoding method with a high compression ratio and loss ratio. When the importance factor is high, the image segment is encoded by an encoding method with a low compression ratio and loss ratio.

In operation S1050, a bitstream including the display identifier, the importance factor and an encoded image segment is transmitted to the image reproduction control apparatus 300. The bitstream may further include at least one of audio data, caption data and additional data. The additional data may include data on at least one of an input image, contents related to an input image, a channel providing an input image and other channels available for selection other than the channel.

The operation S1010 for obtaining the display identifier, the operation S1020 for extracting an image segment, the operation S1030 for determining the importance factor, the operation S1040 for generating an encoded image segment and the operation S1050 for transmitting a bitstream are performed individually for each of the plurality of displays 130. Accordingly, the input image 240 is divided into a plurality of image segments corresponding to the plurality of displays 130, respectively, and the image segments are encoded into encoded image segments according to the importance factor. Then, together with the display identifier and the importance factor corresponding to each image segment, the encoded image segment is transmitted to the image reproduction control apparatus 300.

Figure 11:
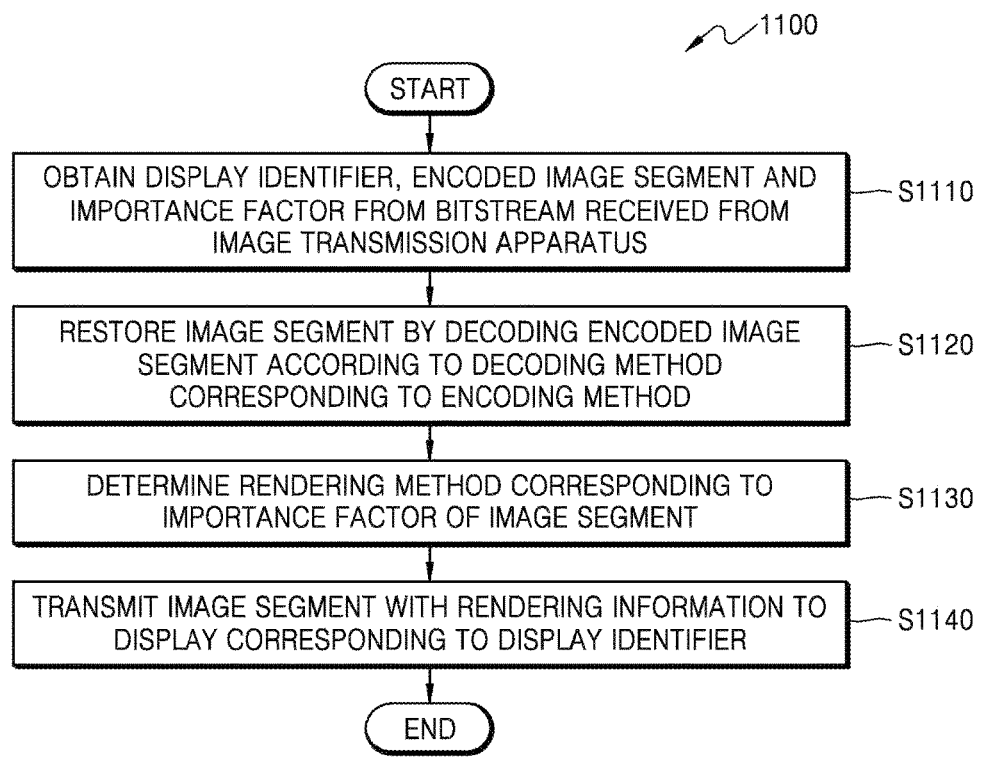
FIG. 11 is a flowchart of a method of controlling an image reproduction according to an exemplary embodiment.

FIG. 11 is a flowchart of an image reproduction control method 1100 of an image reproduction control apparatus 30 that controls an image segment to be reproduced in a plurality of displays 130 according to an exemplary embodiment.

In operation S1110, a display identifier, an encoded image segment and the importance factor are obtained from a bitstream received from the image transmission apparatus 200. When caption data, audio data and additional data are included in the bitstream, the caption data, audio data and additional data may also be obtained.

In operation S1120, an encoded image segment is decoded by a decoding method corresponding to the encoding method used to encode the image segment, and thus the image segment is restored.

In operation S1130, a restored image segment is rendered according to a rendering method corresponding to the importance factor of the image segment.

When caption data is included in the bitstream, it may be determined whether or not a caption included in the caption data is to be inserted into the image segment according to the importance factor of the image segment. For example, a caption may be included in an image segment with a higher importance factor.

When audio data is included in the bitstream, information on the volume of the audio data is determined according to the importance factor of the image segment. Then, the audio data is reproduced according to the volume determined in the display. For example, audio data may be reproduced at a high volume level in a display that reproduces an image segment with a higher importance factor.

When additional data is included in the bitstream, it may be determined whether or not additional data is displayed on the display according to the importance factor of the image segment. For example, when the importance factor of an image segment is low, additional data may be displayed on the display together with the image segment. As another example, when the importance factor of an image is low, additional data may be displayed on the display instead of the image segment.

In operation S1140, a rendered image segment is transmitted to a display corresponding to the display identifier. The image segment transmitted to the display is reproduced in the display.

In addition, other exemplary embodiments can also be implemented through computer readable code/instructions in/on a medium, e.g., a computer readable medium, to control at least one processing element to implement any above described embodiment. The medium can correspond to any medium/media permitting the storage and/or transmission of the computer readable code. The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. It should be understood that the embodiments described therein should be considered in a descriptive sense only and not for purposes of limitation. Descriptions of features or aspects within each embodiment should typically be considered as available for other similar features or aspects in other embodiments.

While exemplary embodiments have been described with reference to the figures, it will be understood by those of ordinary skill in the art that various changes in form and details may be made therein without departing from the spirit and scope as defined by the following claims.

What is claimed is:

1. An image reproduction control method for controlling an image to be reproduced in a plurality of displays, the image reproduction control method comprising:
    obtaining a display identifier, an encoded image segment, an importance factor, audio data, caption data and additional data from a bitstream received from an image transmission apparatus;
    decoding the encoded image segment, which is encoded according to an encoding rate corresponding to the importance factor, according to a decoding rate corresponding to the encoding rate, and extracting from the image an image segment to be reproduced in a display corresponding to the display identifier among the plurality of displays, and restoring the image segment;
    determining a rendering method of the image segment corresponding to the importance factor; and
    transmitting the image segment with rendering information on the rendering method to a display corresponding to the display identifier which is generated based on information on an arrangement of the plurality of displays in order to identify a position of the display among the plurality of displays,
    wherein the importance factor is determined for the image segment of the display, and determined based on features regarding an external environment of the display indicating a detected position and eyes of a viewer watching the image, and a portion of the image that the eyes of the viewer are focused on,
    wherein, the rendering method comprises a method of processing picture quality of the image and data processing methods for changing or transforming images and data related to images by inserting a related image or letters into the image or changing sound data related to the image, and
    wherein, the determining the rendering method of the image segment corresponding to the importance factor comprises:
        determining whether a caption included in the caption data is to be inserted into the image segment according to the importance factor of the image segment,
        determining information on volume of the audio data according to the importance factor of the image segment, and
        determining whether the additional data is displayed on the display according to the importance factor of the image segment.

2. The image reproduction control method of claim 1, further comprising:
    rendering the transmitted image segment in the display corresponding to the display identifier; and
    reproducing the rendered image segment.

3. The image reproduction control method of claim 1, further comprising inserting the caption included in the caption data into the image segment transmitted to the display corresponding to the display identifier in response to the obtained importance factor indicating a high importance.

4. The image reproduction control method of claim 1, further comprising:
    generating volume information on a volume level of the audio data to be reproduced by the display corresponding to the display identifier,
    wherein the audio data and the volume information are transmitted with the image segment to the display.

5. The image reproduction control method of claim 1, further comprising:
    transmitting the additional data to the display corresponding to the display identifier in response to the obtained importance factor indicating a low importance,
    wherein, the additional data comprising information on at least one of the image, content related to the image, a channel providing the image, and other channels available for selection other than the channel.

6. An image reproduction control apparatus for controlling an image to be reproduced in a plurality of displays, the image reproduction control apparatus comprising:
    a controller configured to obtain a display identifier, an encoded image segment, an importance factor, audio data, caption data and additional data from a bitstream received from an image transmission apparatus, to decode the encoded image segment, which is encoded according to an encoding rate corresponding to the importance factor, according to a decoding rate corresponding to the encoding rate, and extract from the image an image segment to be reproduced in a display corresponding to the display identifier among the plurality of displays, and restore the image segment, to determine a rendering method of the image segment corresponding to the importance factor, to determine whether a caption included in the caption data is to be inserted into the image segment according to the importance factor of the image segment, to determine information on volume of the audio data according to the importance factor of the image segment, and to determine whether the additional data is displayed on the display according to the importance factor of the image segment; and a transmitter configured to transmit the image segment with rendering information on the rendering method to a display corresponding to the display identifier which is generated based on information on an arrangement of the plurality of displays in order to identify a position of the display among the plurality of displays, wherein the importance factor is determined for the image segment of the display, and determined based on features regarding an external environment of the display indicating a detected position and eyes of a viewer watching the image, and a portion of the image that the eyes of the viewer are focused on, and wherein, the rendering method comprises a method of processing picture quality of the image and data processing methods for changing or transforming images and data related to images by inserting a related image or letters into the image or changing sound data related to the image.

7. The image reproduction control apparatus of claim 6, wherein the image reproduction control apparatus is connected to the display corresponding to the display identifier for reproducing the transmitted image segment.

8. The image reproduction control apparatus of claim 6, wherein the controller is configured to insert the caption included in the caption data to the image segment transmitted to the display corresponding to the display identifier in response to the obtained importance factor indicating a high importance.

9. The image reproduction control apparatus of claim 6, wherein the controller is configured to generate volume information on a volume level of the audio data to be reproduced by the display corresponding to the display identifier, and the transmitter is configured to transmit the audio data and the volume information to the display with the image segment.

10. The image reproduction control apparatus of claim 6, wherein the transmitter is configured to transmit the additional data to the display corresponding to the display identifier in response to the obtained importance factor indicating a low importance, and wherein, the additional data comprises information on at least one of the image, content related to the image, a channel providing the image, and other channels available for selection other than the channel.

11. A non-transitory computer readable recording medium having stored thereon a computer program for executing an image reproduction control method for controlling an image to be reproduced in a plurality of displays, the image reproduction control method comprising:

obtaining a display identifier, an encoded image segment, an importance factor, audio data, caption data and additional data from a bitstream received from an image transmission apparatus;

decoding the encoded image segment, which is encoded according to an encoding rate corresponding to the importance factor, according to a decoding rate corresponding to the encoding rate, and extracting from the image an image segment to be reproduced in a display corresponding to the display identifier among the plurality of displays, and restoring the image segment;

determining a rendering method of the image segment corresponding to the importance factor; and transmitting the image segment with rendering information on the rendering method to a display corresponding to the display identifier which is generated based on information on an arrangement of the plurality of displays in order to identify a position of the display among the plurality of displays, wherein the importance factor is determined for the image segment of the display, and determined based on features regarding an external environment of the display indicating a detected position and eyes of a viewer watching the image, and a portion of the image that the eyes of the viewer are focused on, wherein, the rendering method comprises a method of processing picture quality of the image and data processing methods for changing or transforming images and data related to images by inserting a related image or letters into the image or changing sound data related to the image, and wherein, the determining the rendering method of the image segment corresponding to the importance factor comprises:

determining whether a caption included in the caption data is to be inserted into the image segment according to the importance factor of the image segment, determining information on volume of the audio data according to the importance factor of the image segment, and determining whether the additional data is displayed on the display according to the importance factor of the image segment.

* * * * *